United States Patent

Braun et al.

[11] Patent Number: 6,050,305
[45] Date of Patent: Apr. 18, 2000

[54] LOCKING MECHANISM FOR A ROTARY ELECTRIC LOOM SHEDDING ACTUATOR

[75] Inventors: Dominique Braun, Faverges; Pierre Bourgeaux, Poisy; Jean-Paul Froment, Doussard, all of France

[73] Assignee: Staubli Faverges, Faverges, France

[21] Appl. No.: 09/218,298

[22] Filed: Dec. 22, 1998

[30] Foreign Application Priority Data

Dec. 24, 1997 [FR] France .................................. 97 16736

[51] Int. Cl.[7] .................................................. D03C 3/20
[52] U.S. Cl. ............................ 139/455; 139/76; 254/376
[58] Field of Search ............................. 254/376; 310/77; 477/22; 139/66 R, 455, 79, 80, 81, 76

[56] References Cited

U.S. PATENT DOCUMENTS

| | | | |
|---|---|---|---|
| 2,539,836 | 1/1951 | Hoffmann | 172/36 |
| 3,109,628 | 11/1963 | Eells et al. | 254/167 |
| 3,163,400 | 12/1964 | Skerry | 254/167 |
| 3,524,626 | 8/1970 | Pomagalski et al. | 254/167 |
| 4,039,874 | 8/1977 | Sutter | 310/77 |
| 4,433,704 | 2/1984 | Decuq | 139/76 |
| 4,858,655 | 8/1989 | Palau et al. | 139/76 |
| 5,069,256 | 12/1991 | Goodman, Jr. | |
| 5,070,266 | 12/1991 | Janczak et al. | |
| 5,335,564 | 8/1994 | Vinciguerra | 139/76 |

FOREIGN PATENT DOCUMENTS

| | | |
|---|---|---|
| 0353005 | 1/1990 | European Pat. Off. . |
| 0750061 | 12/1996 | European Pat. Off. . |

Primary Examiner—Andy Falik
Attorney, Agent, or Firm—Dowell & Dowell, P.C.

[57] ABSTRACT

A locking mechanism for a rotary electric actuator for the formation of a shed on a loom wherein the actuator includes a driving rotor for rotating a device for winding and unwinding a harness thread and wherein the actuator includes a locking plate driven by the rotor which interacts with a locking member such that, when a stop of the locking member engages the locking plate, rotation of the rotor is stopped. A control mechanism is provided to selectively maneuver the locking member relative to the locking plate.

19 Claims, 6 Drawing Sheets

LOCKING MECHANISM FOR A ROTARY ELECTRIC LOOM SHEDDING ACTUATOR

BACKGROUND OF THE INVENTION

1. Field of the Invention

The present invention relates to a locking mechanism for a rotary electric actuator intended for the formation of the shed on a loom, in particular for the control of the harness threads of a Jacquard-type weaving mechanism or of heddle frames of a loom provided with a dobby. The invention also relates to a weaving mechanism and to a weaving loom provided with such a mechanism.

2. Description of the Related Art

In Jacquard-type weaving mechanisms it is known to drive, in opposition of phases, two frames each of which is provided with a multiplicity of horizontal griffes or knifes appropriate for the vertical movement of hooks connected to the harness threads by a pulley or lifting mechanism. Mechanical or electromechanical devices are provided to immobilize these hooks along their vertical movement. This type of mechanism requires considerable power to operate the frames of the griffes, being this power supplied by the driving shaft of the loom, which leads to an oversizing of such a loom.

It is also known to use a rotary motor such as a stepping motor or a servomotor to linearly control a twine belonging to a loom.

A loom is not in constant operation, in order to be stopped at the end of the job or for the maintenance operations. Classically, looms are provided with a safety stop. In view of the foregoing reasons, it is beneficial to provide a locking mechanism to immobilize the rotary actuators, that is to say, the electric motors controlling the pulleys, so that in its shut-off position the loom maintains its off-position which would allow a rapid restart without any defects in the weft of the fabric being manufactured. In view of the large number of actuators belonging to a weaving mechanism, the associated locking mechanism must be compact and of simple construction in order to offer a low cost and great reliability. Further, the power consumption of a locking mechanism must be as low as possible in order not to originate very high operating costs.

SUMMARY OF THE INVENTION

With this in mind, the present invention relates to a locking mechanism for a rotary electric actuator for the formation of the shed on a loom, this actuator being provided with a driving motor for a pulley for the winding of a harness thread, characterized by the fact that it comprises a locking plate, driven by said motor, and a mechanically operated tongue, which tongue is provided with rotating immobilization means of said plate.

Thanks to the present invention, the rotor and the pulley actuated by it can be effectively immobilized by the action of the controlled tongue on the locking plate. Furthermore, the mechanism of the invention has the advantage of being compact, reliable and of low power consumption.

In accordance with a first advantageous aspect of the invention, the locking plate is provided with at least one first projection, the tongue being provided with at last an additional second projection suitable to engage with the first projection; the engaging of the first and second projections allow an effective locking of the rotating plate.

In accordance with another advantageous aspect of the invention, the tongue is provided with a fixed point and a movable extremity provided with the second projection and under tension by elastic means towards the first projection. Thus, thanks to the elastic means, the position obtained in the case of failure of the tongue, due to lack of control, corresponds to a position by engaging of the projections, that is to say, the locking of the actuator.

In accordance with another advantageous aspect of the invention, the elastic means allow a movement of release of the first and second projections in the case of an overloading of the locking plate; at least, one of the first and second projections are of conical, truncated, triangular, or rounded shape. This allows, for example, a release of the catch of the tongue from a groove in the locking plate should a stress applied by the rotating part of the actuator be of such a nature that it would damage the locking mechanism.

In accordance with another advantageous aspect of the invention, the tongue is provided with a control element appropriate to interact with a catch of the tongue between a position in which the second projection is engaged with the first projection and a position in which the second projection is disengaged from the first projection. This control element, that can be obtained by casting it together with the catch so as to constitute a single piece, allows the movement of the tongue between its two constant positions.

In accordance with another advantageous aspect of the invention, the first projection and/or the control element are molded at the free end of the tongue. This type of design is of low cost and allows a precise positioning of the first projection and of the control element with respect to the tongue, which positioning is reliable over a period of time.

In accordance with a particularly advantageous aspect of the present invention, the device comprises a rod provided with at least one collar and extending in the proximity of a movable end of the tongue, which rod moves by translational motion in accordance with its largest axis, it being possible that the control element of the tongue be displaced by the collar of the rod. Thus, this rod constitutes a simple and efficient control element of the tongue.

In accordance with another advantageous aspect of the invention, the mechanism comprises a means of simultaneous control for several tongues that are appropriate to interact with the plates corresponding to several adjacent actuators. This aspect of the invention can be considered due to the fact that a Jacquard-type loom comprises a great number of harness threads that could reach, and even exceed, 10,000, and consequently a large number of actuators. Thus, the invention allows to simultaneously control several actuators, which corresponds to the fact that the locking of the actuators must be effectuated concomitantly with the stopping of the loom.

The design can also be such, that the mechanism is adapted to the locking of the actuators of a module comprising several actuators, because it is provided with several rods that extend parallel to each other in the proximity of the free ends of the tongues; the rods are controlled by translational motion by a common cam extending essentially parallel to the rods. This type of construction allows a collective control of the tongues of the mechanism of the invention, while the system used for its operation is mechanically simple which renders it reliable.

In accordance with another advantageous aspect of the invention, the locking plate is suitable to interact with a scanner to determine the angular position of the actuator. This scanner or encoder, that can be of any known type and particularly optical or infrared, allows to constantly control the position of the movable locking plate of the actuator, be it moving or immobilized thanks to the locking mechanism. The position of the harness thread or of the harness threads controlled by this actuator is thus indirectly known.

In accordance with another advantageous aspect of the invention, the tongue is mechanically operated between two constant locking and releasing positions of the locking plate. This allows the tongue to rest in one of these positions when the actuator is not operating. The kinematic control link of the tongue may comprise a cam driven by an electric motor and movable between two constant positions when this motor is not energized.

The invention also relates to a weaving mechanism that comprises one or more actuators provided with a locking mechanism such as described above, and a loom equipped with such a mechanism. This mechanism is simpler to use and to maintain than the devices of known type, and it allows a thread by thread control of a Jacquard loom harness. Thus, the efficiency of a loom in accordance with the invention is considerably improved with respect to the known techniques.

BRIEF DESCRIPTION OF THE DRAWINGS

The invention will be better understood and its other advantages will be shown more clearly through the below description of three embodiments of a locking mechanism for a rotary electric actuator of a Jacquard-type weaving mechanism in accordance with its principle, given only by way of example and making reference to the accompanying illustrations wherein.

DESCRIPTION OF THE PREFERRED EMBODIMENT

Figure 1:
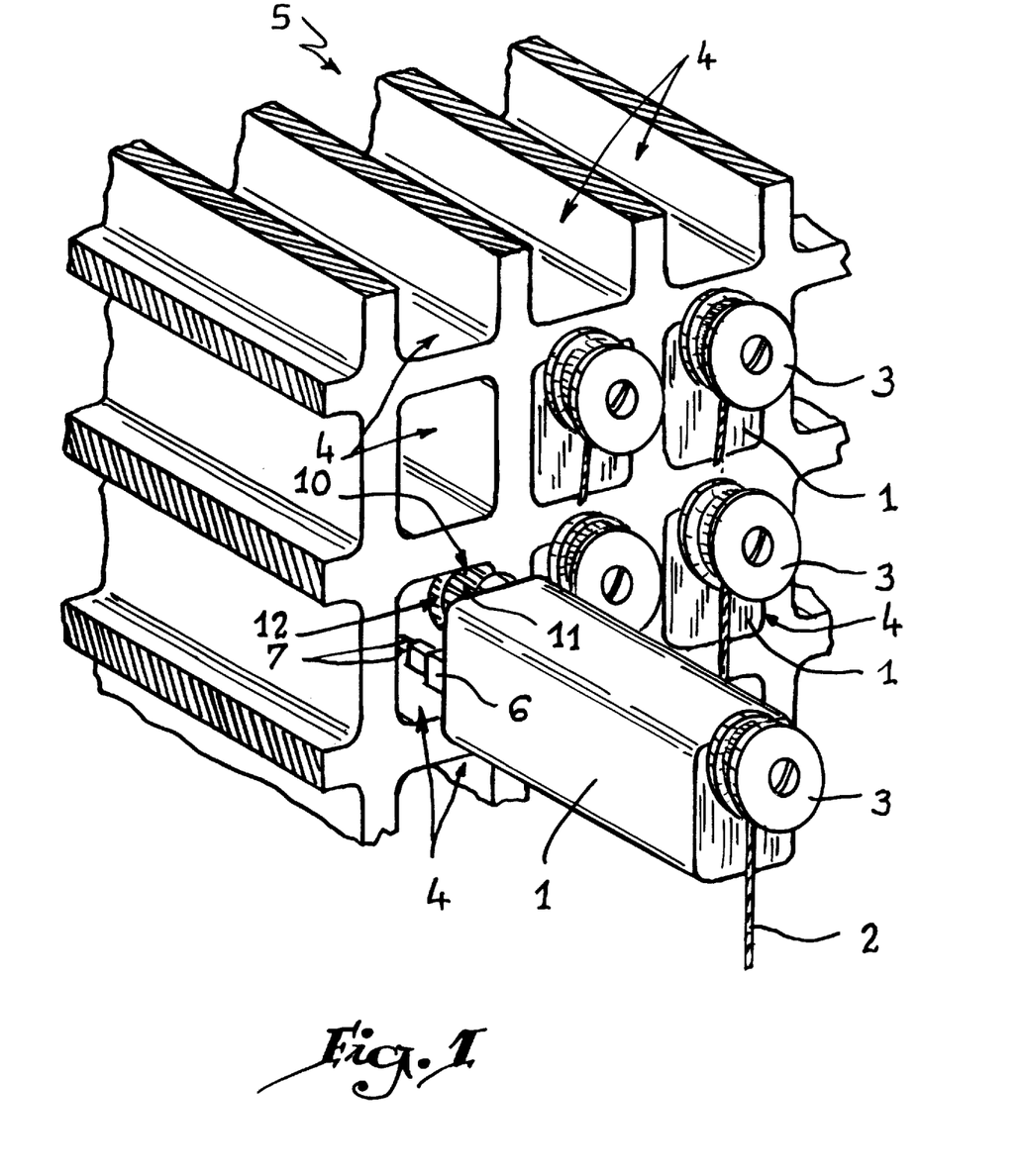
FIG. 1 shows a diagrammatical illustration of the principle of several rotary electric actuators, used in a Jacquard-type weaving mechanism.

The actuators 1 illustrated in FIG. 1 are intended for the control of the harness threads 2 of a Jacquard-type weaving mechanism for the formation of the shed on a loom. Each actuator 1 comprises a pulley 3 on which is wound-up the respective harness thread 2 depending on the position of the rotor of the actuator in question.

In view of the great number of actuators that are necessary for the operation of the numerous harness threads of the mechanism, the actuators 1 are installed in the compartments 4 of a housing 5. As shown more clearly in FIGS. 2 and 3, the actuators 1 can be rearranged in modules comprising, for example, sixteen actuators. In such a case, the housing 5 contains sixteen compartments 4. On their back, that is to say on the side opposite the pulley 3, the actuators 1 are provided with an extension 6 with connector pins 7 for the power supply from the stator or stators of the actuator 1. When an actuator 1 is in position in the respective housing 4, the extension 6 and the pins 7 project towards the outside of the compartment 4 towards the back of the housing or the module 5.

Figure 2:
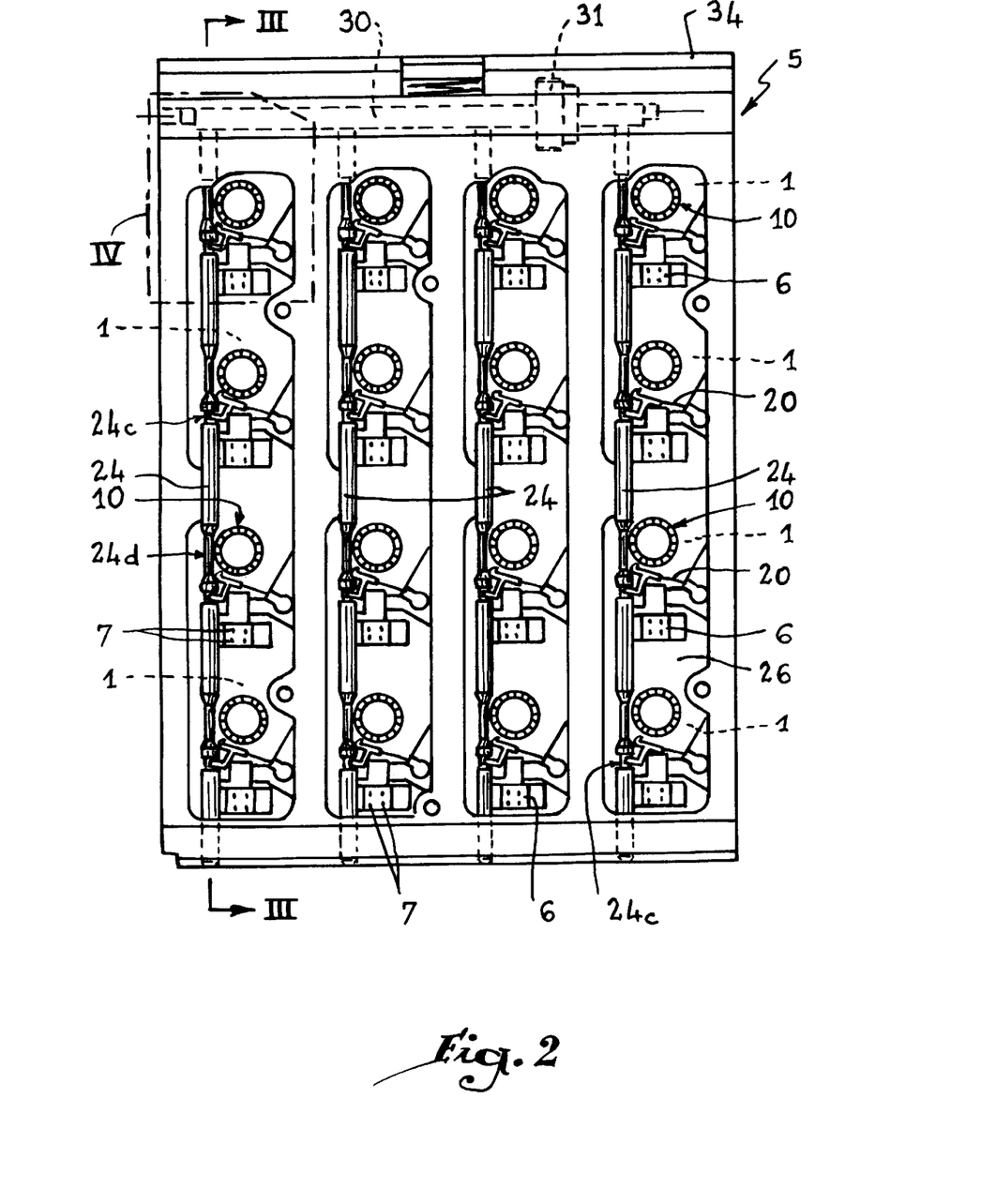
FIG. 2 shows a rear view of a module comprising sixteen actuators of the type illustrated in FIG. 1.
Figure 3:
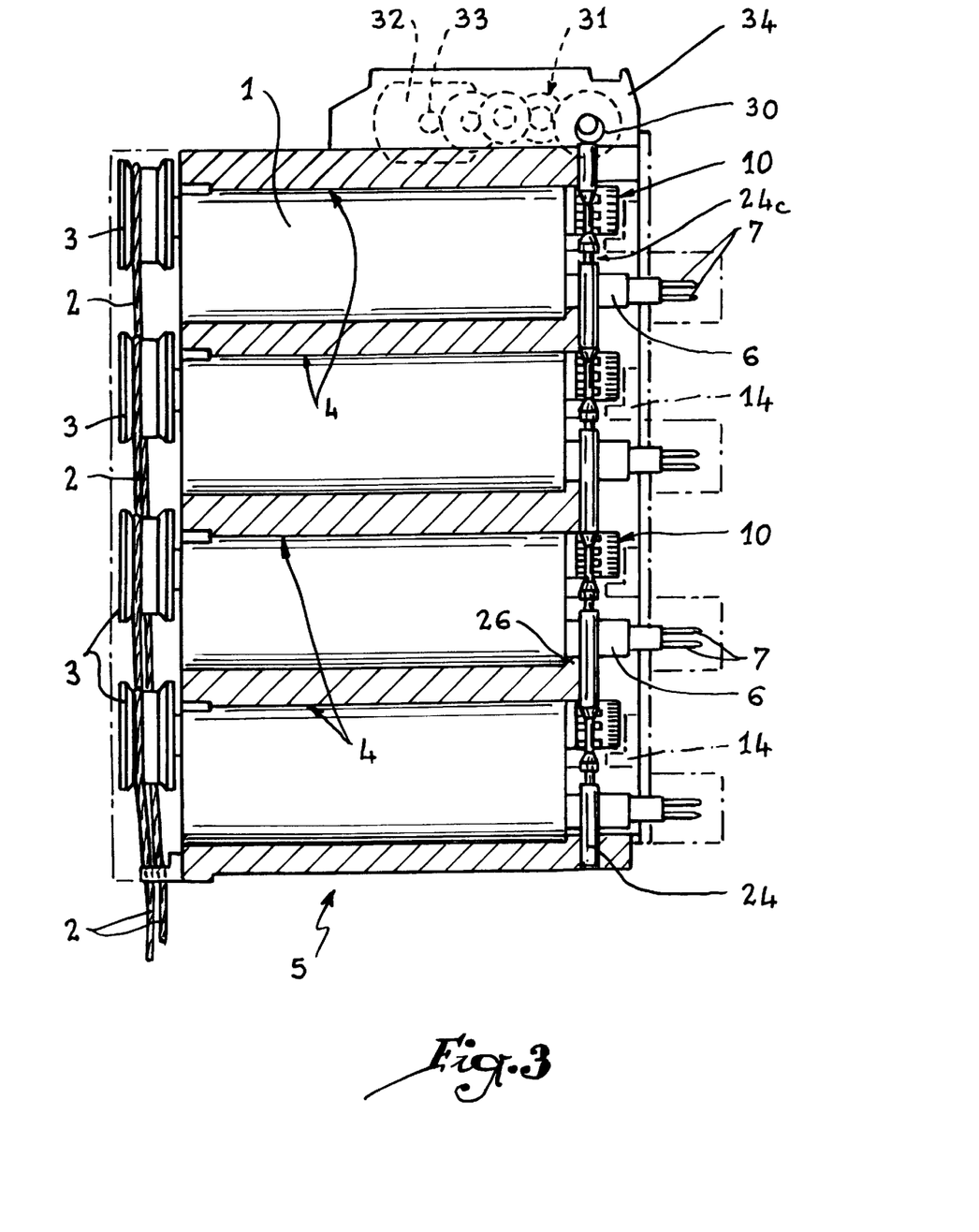
FIG. 3 shows a sectional drawing along the line III—III of FIG. 2.

In accordance with the invention and in order to obtain an efficient locking action for each actuator, the rotor of each actuator is provided with locking elements in the form of a locking plate 10 of which the peripheral radial surface is provided with grooves or channels 11. Furthermore, a tongue 20, intended to immobilize the locking plate, is provided in the proximity of the locking plate 10 of each actuator 1. Each tongue 20 is kept in its position by one of its extremities 20a, that is enclosed in a seat or opening 5a of the housing 5. This seat 5a is formed in a rib 5b provided in the back of the housing 5. On the free end 20b opposite the tongue 20 is mounted a catch or hook 21 appropriate to engage with one of the grooves 11 of the locking plate 10.

In accordance with a not illustrated variant of the invention, it is also possible to see to it that each tongue 20 is provided with several catches arranged in a circumference having a radius essentially equal to that of the locking plate 10, so that it simultaneously engages with several grooves 11.

When the catch 21 is engaged with one of the grooves 11, it immobilizes the locking plate 10 which is firmly attached to the not represented rotor of the actuator 1. Thus, the pulley 3 of the respective actuator and, consequently, the harness thread 2 are kept in position.

The tongue 20 is an elastic, metallic and flexible tongue whose elasticity can be used because it has a constant tendency to return to its predetermined position, in the style of a leaf spring. This predetermined position may be chosen so that the tongue 20 tends to elastically apply the catch 21 to one of the grooves 11. The elastic nature of the tongue 20 does allow, in the case of an overload of the locking plate 10, the release of the catch 21 from a groove 11 into which it had engaged. To accomplish this, the catch is truncated shaped or triangular. The grooves 11 can also be of a corresponding truncated or triangular shape.

Figure 4:
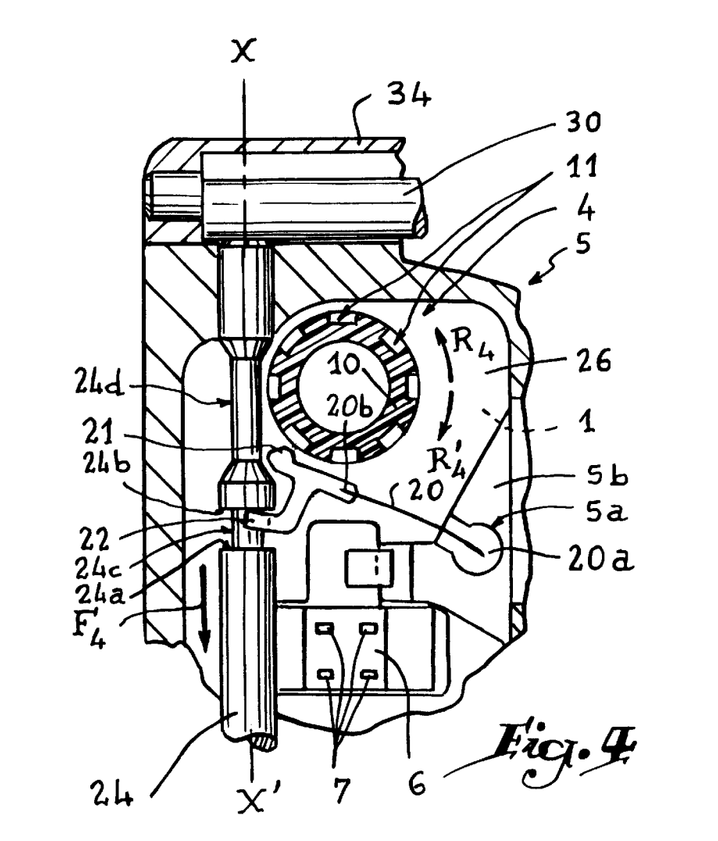
FIG. 4 shows a view at enlarged scale of detail IV of FIG. 2, in a first position.
Figure 5:
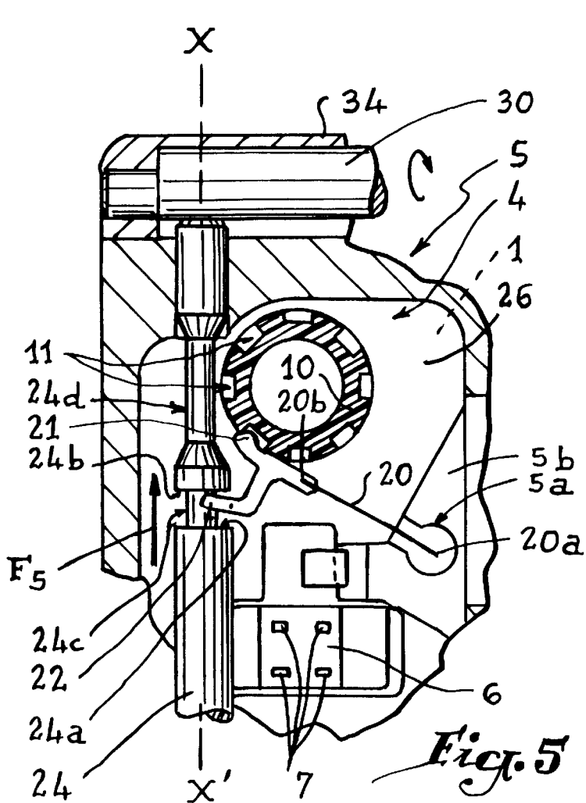
FIG. 5 shows a view analogous to that of FIG. 4, in a second position.

The tongue 20 is provided at its free end 20b with a forked-shaped or bifurcated plate 22, that is fabricated as a single piece with the catch 21 being cast with said plate on the free end 20b of the tongue 20. However, other embodiments of the catch 21 and of the plate 22 can be contemplated and, in particular, the bending of the free end of the tongue 20. The plate 22 is intended to interact with a rod 24 provided with collars 24a, 24b in such a way that the fork can clasp the rod 24 in a section of reduced diameter 24c between two collars 24a or 24b. The rod 24 moves by translational motion parallel to its largest axis, that is to say, to its largest size. In FIGS. 4 and 5 the arrows $F_4$ and $F_5$ show the two directions of movement of the rod 24. By comparing FIGS. 4 and 5, it seems that depending on the position of the rod 24 the plate 22 and the catch 21 are moved between the two free or locked positions of FIGS. 4 and 5.

More precisely, in the position of FIG. 4, the rod 24 is displaced into the direction of the arrow $F_4$ in such a manner that the collar 24b pushes the plate 22 into the direction of the arrow $F_4$ and that the catch 21 is released from the grooves 11. Thus, the locking plate 10 rotates freely, which is represented by the arrows $R_4$ and $R'_4$. The actuator 1 can thus be freely energized to cause the winding or the unwinding of the corresponding harness thread on the pulley 3.

In the position of FIG. 5, the rod 24 was displaced in the direction of the arrow $F_5$. The collar 24b does not impede the movement of the tongue 20 under the effect of its elasticity. The tongue 20 returns spontaneously to the position of FIG. 5 or the catch 21 engages into one of the grooves 11.

The rod 24 has a section 24d of less diameter in the proximity of the locking plate 10 in order to prevent any risk of jamming. The collars 24a and 24b of the rod 24 could also be achieved by rings mounted on the rod 24 which would then have one only diameter equal to that of the sections 24c and 24d.

Figure 6:
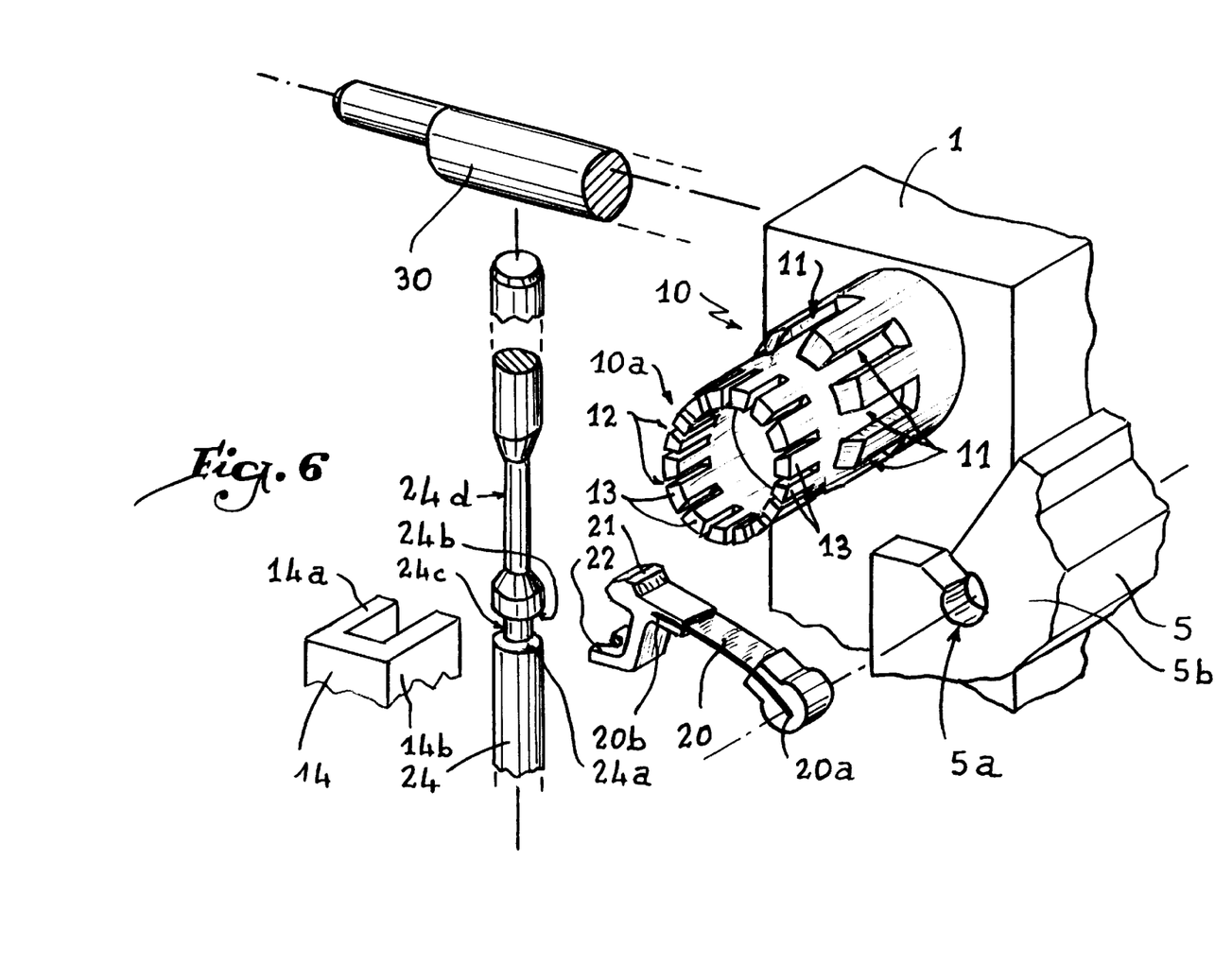
FIG. 6 shows an exploded view in perspective of some components of the detail of FIGS. 4 and 5.

As shown more clearly in FIG. 6, in the proximity of its edge most distant from the rotor of the actuator 1, the locking plate 10 is provided with a series of slots 12 defining the teeth 13 between them. The objective of these teeth and these slots is that of interacting with a scanner 14, for example, optical, of which one of the two probes 14a and 14b is positioned inside the plate 10 while the other one is outside of the plate 10 in order to determine the angular position of this locking plate. In other words, the scanner 14 is an encoder allowing to detect the angular position of the locking plate 10 and, thus, of the pulley 3. It can be associated with the electric control device of the actuator 1.

The teeth 13 of the locking plate 10, separated by the slots 12, are provided on the extremity section 10a whose diameter is less than the section of the locking plate 10 in which are provided the grooves 11. It is because of this difference of diameter that the catch 21 of the tongue 20 does not tend to become engaged in the lots 12 under the effect of the elasticity of the tongue 20, whenever the actuator 1 is removed from the compartment 4 of the housing 5, especially during maintenance operations. In other words, this difference of diameter of the extremity section 10a of the locking plate 10 with respect to the main section facilitates the removal of the actuator 1 from its lodging.

As illustrated very clearly in FIGS. 2 and 3, a rod 24 can control several tongues 20 belonging to several adjacent actuators, for example, to four actuators of one column. This type of design enables to limit the number of moving parts for the control of the various catches 21. The various rods 24 are parallel to each other and arranged in the proximity of the free extremities 20b of the tongues 20, so as to interact with the respective plates 22. The rods 24 are operated by translational motion, that is to say, by movement according to the arrows $F_4$ and $F_5$, thanks to a cam essentially perpendicular to the rods 24. The cam 30 is operated through a reduction gear 31 by a motor 32, for example, electric, of which the output pinion 33 can be seen in FIG. 3. A cover 34 protects the elements 30 to 32.

The functioning is as follows:

Before the loom is put into operation, the electric motor 32 is operated in such a manner that, through the reduction gear 31, its pinion 33 drives the cam 30 up to the position in FIG. 4, in which it drives back the various rods 24 so that the catches 21 are removed from the locking plates 10. The various actuators 1 can be set into operation in this position.

When it becomes necessary to lock into position the mechanism for the formation of the shed, comprising the actuators 1, the pinion 32 is driven in reversed direction so that the cam 30 reaches the position of FIG. 5, and that the various catches 21 engage inside the grooves 11 of the respective locking plates 10. The positions of the cam 30, represented in FIGS. 4 and 5, arc two constant positions, stopped against the housing 5 or the cover 34. Thus, the cam remains in one of these positions when he motor 32 is not energized. The power supply of the motor 32 can thus be switched off when the cam 30 is not programmed to operate, which allows to limit the power consumption of the unit.

The position in the case of an outage of the motor 32, that is to say, its position in the case of a power shut-off, especially at the time of holidays, on a weekend or in the case of a disconnection of the electric installation, preferably corresponds to the position of the cam 30, illustrated in FIG. 5, so that in this case all the actuators 1 are immobilized. An emergency battery is advantageously provided for the supply of the motor 32 should a current outage occur in the sector. This battery enables the motor to move the cam 30 up to the position illustrated in FIG. 5.

Figure 7:
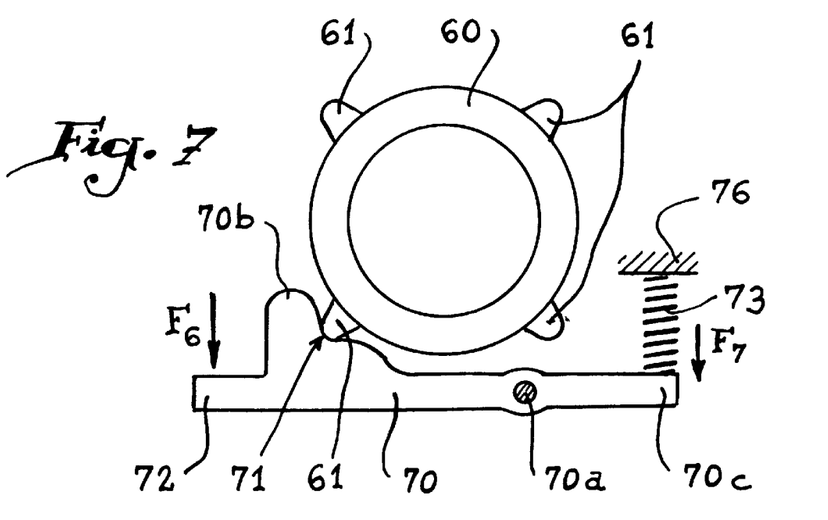
FIG. 7 shows a view analogous to that of FIG. 4 of a mechanism in accordance with a second embodiment of the invention.

In the second embodiment of the invention, illustrated in FIG. 7, the elements analogous to those of the embodiment of FIGS. 1 to 5 are identified by the same reference numbers but increased by 50. A locking ring or plate 60 is provided to be driven by a rotor of a not illustrated rotary electric actuator. The locking plate 60 is provided with tooth-shaped locking elements in the form of extensions 61 arranged around its peripherical radial surface. Furthermore, a tongue 70 is articulated around a fixed point 70a, embodied by a swivel pin. At the level of an extremity 70b the tongue 70 is provided with a notch 71 functioning as a catch to engage with one of the teeth 61 of the locking plate 60. In the proximity of the notch 71 the tongue 70 is provided with a plate 72 for the receiving of a control signal represented by the arrow $F_6$. At its extremity 70c, opposite the extremity 70b, the tongue 70 is connected to a spring 73 fastened to a stationary part 76 of a housing containing the actuator that drives the rotary locking plate 60.

The functioning is as follow:

Under the effect of the thrust stress $F_7$, exerted by the spring 73 on the extremity 70c, the extremity 70b of the tongue 70 is constantly directed towards the locking plate 60 in such a manner that the notch 71 becomes engaged with one of the teeth 61. Thus, the locking plate is locked. When it is desirable to unlock the locking plate 60, a control signal is applied to the plate 72, as represented by the arrow $F_6$, which causes the tongue 70 to swivel in the trigonometric direction illustrated in FIG. 7, and which has the effect of releasing the notch 71 from the teeth 61 of the locking plate 60. The locking plate 60 can then freely rotate. Since the stress $F_6$ is curbed, the tongue 70 rotates in a clockwise direction, as illustrated in FIG. 7, in such a manner that the notch 71 becomes engaged with one of the teeth 61 under the effect of the stress $F_7$, exerted by the spring 73.

Figure 8:
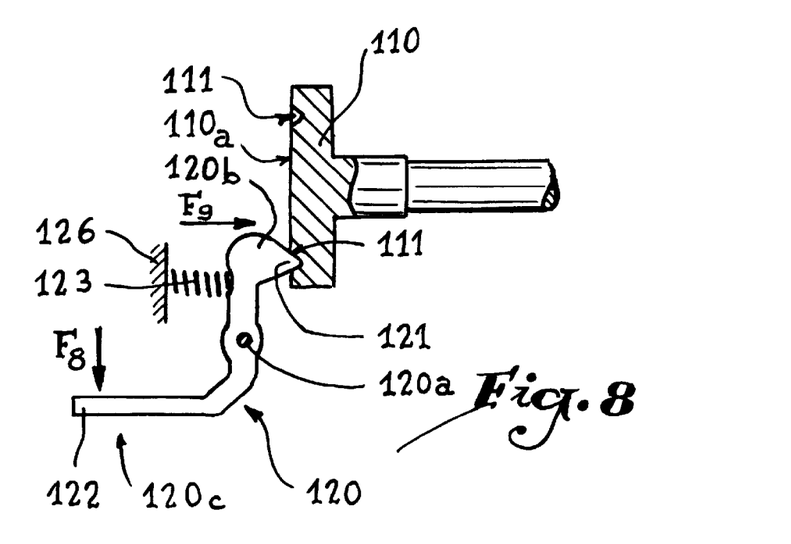
FIG. 8 shows a diagram of principle of a mechanism in accordance with a third embodiment of the invention.

In the third embodiment of the invention, illustrated in FIG. 8, the elements analogous to those of the embodiment of FIGS. 1 to 5 are identified by the same reference numbers but increased by 100. A locking ring or plate 110 is provided to be driven by the rotor of a not illustrated rotary electric actuator. The locking plate 110 is provided with locking elements in notches 111 on its radial surface of the extremity 110a.

Furthermore, a bent tongue 120 is articulated around a fixed point 120a. At a first extremity 120b, the tongue 120 is provided with a catch 121 intended to selectively enter into one of the notches 111. At its other end 120c, the tongue 120 is shaped as a plate 122 upon which can be applied a control signal represented by the arrow $F_8$. A spring 123 is provided between the extremity 120b of the tongue 120 and a stationary part 126 of a not represented housing. The spring 123 operates by compression, in such a manner that it tends to push the point 121 towards one of the notches 111, which is represented by the stress $F_9$ in FIG. 8.

As above, while no stress is applied on the plate 122, the catch 121 rests engaged in one of the notches 111. When one wishes the locking plate 110 to turn, a stress is applied in the direction represented by the arrow $F_8$, in such a manner that the tongue 120 rotates in the trigonometric direction around the fixed point 120a releasing the locking plate 110. As soon as the control signal $F_8$ is cancelled, the stress $F_9$ exerted by the spring 123 pushes the point or catch 121 towards the locking plate 110 in such a manner that it engages in one of the notches 111.

In the second and third embodiments of the invention, illustrated in FIGS. 7 and 8, the notches 71 and 111 and the male parts 61 and 121 are of conic or rounded shape, which allows a release movement of the engaged elements against the force of the springs 73 and 123 in the case of an overloading of the locking plates 60 and 110. This represents a safety feature of the mechanism which prevents its destruction in the case of a considerable overload applied to the actuator.

The invention was illustrated with the tongues provided with locking projections of the locking plate. The invention is also applicable with a tongue provided with a block appropriate to rest on an external radial surface of the locking plate in order to immobilize it by friction.

Although essentially described as relating to a locking mechanism for an actuator of a Jacquard mechanism, the invention can also be applied to textile machines equipped with dobbies, and to textile machines in general and, in particular, to machine-knitting for the control of the needles.

What we claim is:

1. A locking mechanism for a rotary actuator for the formation of a shed on a loom, the locking mechanism comprising:

an actuator having a driving rotor for a device for winding and unwinding a harness thread, a locking plate driven in rotation by said driving rotor, a locking member including a stop means for selectively engaging said locking plate, and means for controlling movement of said locking member between a first position in which said stop means engages said locking plate to thereby stop rotational movement of said driving rotor to a second position in which said stop means is spaced from said locking plate to thereby permit rotational movement of said driving rotor.

2. The locking mechanism of claim 1, wherein said locking plate is provided with at least one locking element and said stop means of said locking member includes a catch for engaging with said at least one locking element.

3. The locking mechanism of claim 2, wherein said locking member is provided with a fixed point and a moveable extremity provided with said catch, and means for resiliently urging said moveable extremity towards said at least one locking element.

4. The locking mechanism of claim 3, wherein one of said at least one locking elements and said catch are configured to permit forced rotational movement of said driving rotor when said locking member is in said first position.

5. The locking mechanism of claim 3, wherein said locking plate is generally annular in configuration, a plurality of locking elements formed in said annular locking plate, said elements being defined by spaced slots in said annular locking plate.

6. The locking mechanism of claim 5, wherein said locking member is in the form of a resilient tongue having a base seated within a support seat, said tongue including an outer extremity from which said catch extends so as to be selectively engageable within said slots, and a control element extending from said tongue and engageable with said means for controlling movement of said locking member.

7. The locking mechanism of claim 3, including a plurality of locking elements, said locking elements being formed as projections extending from said locking plate, said catch of said locking member being in the form of a notch formed in said locking member, and a control element extending from said locking member for selectively being engaged by said means for controlling movement of said locking member.

8. The locking mechanism of claim 3, wherein said locking plate includes an outer surface, and a plurality of locking elements formed as spaced notches in said outer surface of said locking plate.

9. The locking mechanism of claim 2, wherein said locking member is provided with a control element engageable by said means for controlling movement of said locking member.

10. The locking mechanism of claim 9, wherein said stop means and said control element are integrally formed.

11. The locking mechanism of claim 9, wherein said means for controlling movement of said locking member includes a rod provided with at least one extension extending in the proximity of said control element of said locking member, and means for moving said rod so that said at least one extension is selectively engageable with said control element.

12. The locking mechanism of claim 11, in which said means for moving said rod includes a cam member engageable with said rod, and means for connecting said cam member to a motor.

13. The locking mechanism of claim 11, including scanner means for detecting movement of said locking plate to thereby determine an angular position of said device for winding and unwinding a harness thread.

14. In a weaving loom including a weaving mechanism for the formation of a shed wherein the weaving mechanism includes a plurality of harness threads, the improvement comprising:

a plurality of rotary electrical actuators each including a driving rotor for a device for winding and unwinding a harness thread, each actuator including a locking plate driven in rotation by said rotor, a plurality of locking members including stop means for selectively engaging each of said locking plates of said plurality of actuators, means for mounting each of said locking members adjacent to said plurality of locking plates, and means for controlling movement of each of said locking members between a first position in which said stop means engage said locking plates to thereby stop rotational movement of said driving rotors to a second position in which said stop means are spaced from said locking plates to thereby permit rotational movement of said driving rotors.

15. The weaving loom of claim 14, wherein each of said locking plates is provided with at least one locking element and each of said stop means of said locking members includes a catch for engaging one of said at least one locking elements.

16. The weaving loom of claim 15, wherein each of said locking members include a moveable extremity having a catch, and means for resiliently urging said moveable extremity towards one of said at least one locking elements.

17. The weaving loom of claim 16, wherein said means for controlling movement of said locking members includes at least one rod provided with a plurality of spaced extensions extending in the proximity of said control elements of a plurality of said locking members, and means for moving said at least one rod so that said plurality of extensions are selectively engageable with said control elements.

18. The weaving loom of claim 17, in which said plurality of actuators are mounted within a housing, a plurality of said rods extending generally parallel with respect to one another and each including a plurality of extensions such that each rod is selectively engageable with a plurality of locking members.

19. The weaving loom of claim 18, wherein said means for moving said at least one rod includes a plurality of cams for engaging said plurality of rods, and means for connecting said plurality of cams to a drive motor.

* * * * *